(12) United States Patent
Burton

(10) Patent No.: US 6,257,747 B1
(45) Date of Patent: Jul. 10, 2001

(54) HEADLAMP ADJUSTER

(76) Inventor: John E. Burton, 707 W. Court St., Ludington, MI (US) 49434

( * ) Notice: Subject to any disclaimer, the term of this patent is extended or adjusted under 35 U.S.C. 154(b) by 0 days.

(21) Appl. No.: 09/329,746

(22) Filed: Jun. 10, 1999

(51) Int. Cl.[7] .................................................. F21V 19/02
(52) U.S. Cl. ......................... 362/524; 362/273; 362/289; 362/424
(58) Field of Search .................................. 362/524, 289, 362/273, 424, 423; 74/89.13

(56) References Cited

U.S. PATENT DOCUMENTS

| | | |
|---|---|---|
| 4,210,033 | 7/1980 | Erikson et al. . |
| 4,674,018 | 6/1987 | Ryder et al. . |
| 4,737,891 | 4/1988 | Burton . |
| 4,881,152 | 11/1989 | Watanabe et al. . |
| 4,893,219 | 1/1990 | Lisak . |
| 4,939,945 | 7/1990 | Ryder et al. . |
| 5,079,676 | 1/1992 | Lisak . |
| 5,161,877 | 11/1992 | Wright et al. . |
| 5,193,905 * | 3/1993 | Edwards et al. ..................... 362/524 |
| 5,214,971 | 6/1993 | Burton et al. . |
| 5,251,114 * | 10/1993 | Cantin et al. ........................ 362/524 |
| 5,309,780 | 5/1994 | Schmitt . |
| 5,453,914 | 9/1995 | Dobler . |
| 5,486,985 | 1/1996 | Kemper et al. . |
| 5,526,238 | 6/1996 | Van Oel et al. . |
| 5,546,283 | 8/1996 | Ohtsuka et al. . |
| 5,707,133 | 1/1998 | Burton . |
| 5,746,559 | 5/1998 | Shirai . |
| 6,017,136 | 1/2000 | Burton . |

* cited by examiner

Primary Examiner—Stephen Husar
(74) Attorney, Agent, or Firm—Brian G. Gilpin; Godfrey & Kahn, S.C.

(57) ABSTRACT

A headlamp adjuster includes a gear housing having a neck through which an input shaft extends in an interference fit. The interference fit provides a resistance to rotation of the input shaft. A drive gear is disposed within the gear housing and is connected to the input shaft such that rotation of the input shaft causes rotation of the drive gear. An adjustment gear is disposed within the gear housing such that it intermeshes with the drive gear. The adjustment gear has a bore therethrough that is at least partially threaded. An adjustment shaft is threaded through the bore through the adjustment gear. The adjustment shaft may include a force-limiting feature to prevent over-adjustment of the adjuster.

25 Claims, 6 Drawing Sheets

HEADLAMP ADJUSTER

BACKGROUND OF THE INVENTION

This invention relates generally to adjuster mechanisms, and in particular to a headlamp adjuster mechanism for use in motor vehicles.

As the design of vehicles, automobiles and small trucks in particular, has evolved, headlights have continually been reconfigured to improve the aerodynamics of the front end of the vehicle. Modern headlights are designed so that their lenses follow the contour of the vehicle to provide an aerodynamically efficient exterior surface. However, adjustment of these headlights must still be performed in order to provide an optimal beam of light and to prevent the aiming of light beams toward oncoming vehicles. Automotive manufacturers' demand for aerodynamically efficient headlight designs has lead to modular designs requiring the headlight adjustment mechanism to be located within the interior of the engine compartment so that adjustment can be easily performed without removing any trim pieces. Thus, the constraints of the installation area and the demands of the automobile manufacturers for aerodynamic headlight designs dictate that an adjuster for use with the aerodynamic designs be adjustable from inside the engine compartment using ordinary tools, and must be able to translate rotational motion of the adjusting part into linear motion of the adjusting means that adjusts the lamp within the headlight assembly. There are many devices incorporating such designs including, among others, the devices disclosed in U.S. Pat. Nos. 5,707,133 and 5,214,971 to Burton, the inventor of the present invention, the disclosures of which are incorporated herein by reference.

Automotive lamp assemblies used as headlights typically include several basic parts: a support frame, a reflector, a lens, a bulb, and one or more adjusters. The support frame either completely houses the reflector and the bulb on a pivotable mounting to allow the aim of the light to be adjusted using the adjusters or provides a mounting surface for attaching a headlamp adjuster. The lens seals the front of either the support frame or directly to the reflector to protect it from the elements assailing the front end of the vehicle and provides an aerodynamic shape and attractive appearance. The reflector mounts on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Right angle style adjusters, such as the ones disclosed in the referenced Burton patents, are often used to allow the adjustment of the headlight from an adjusting position above the installed headlight. In other applications, motorized adjusters, straight adjusters, or other types of adjuster are used.

One illustrative example of a conventional right angle style headlamp adjuster design is U.S. Pat. No. 4,939,945 to Ryder et al. which discloses a headlamp adjuster having a housing member with two internal chambers—a drive gear chamber and an adjustment gear chamber. The drive gear chamber contains a bevel drive gear and intersects the adjustment gear chamber containing a bevel adjustment gear. Each chamber is dimensioned to position the gears such that they intermesh to translate a rotation of the drive gear into a rotation of the adjustment gear. Such a rotation of the adjustment gear translates into linear movement of a rotationally restrained threaded adjustment member which ultimately causes a change in the angle of the lamp within the headlamp assembly. Rotation of the adjustment member is restrained by the non-rotatable attachment of the adjustment member to the reflector of the headlamp. The adjustment gear includes an adjustment gear bore that is formed through the center of the adjustment gear to engage the adjustment member projecting therethrough. The adjustment gear bore is shaped such that when a thread forming adjustment member is threaded therethrough, the plastic material which is displaced by the threads on the adjustment member has areas in which to flow and threads are formed. Alternatively, the adjustment gear bore is formed with interference threads that mate with threads on the adjustment member. In either embodiment, the interference between the adjustment gear bore and the adjustment member provides a prevailing torque tending to retain the adjustment member in the desired adjustment by providing rotational resistance.

There are a number of drawbacks to headlamp adjuster designs such as the one disclosed in the Ryder et al. patent. First, it is difficult to control the amount of prevailing torque that retains the adjustment member in the desired adjustment. This difficulty arises from the interference or thread-forming fit between the adjustment gear bore and the adjustment member because it is difficult to consistently control the amount of interference due to narrow machining and assembly tolerances. Furthermore, there are many variables to control and influence the prevailing torque variation, e.g., gear tooth profile, gear alignment, gear forces and surface friction between the other moving parts in the gear box. Additionally, if a thread-forming method such as the one disclosed in Ryder et al. is used, small chips of material may be created which tend to impede the rotation of the adjustment gear around the adjustment member.

Second, assembly of the thread-forming adjustment member into the adjustment gear is somewhat problematic. This is because thread-forming has constraints with regard to driver speed during assembly. If the driver speed is too fast, the plastic adjustment gear could significantly soften or melt during driving which can result in a poor quality assembly and/or damage to the internal thread. Restricting the driver speed can slow down the assembly process resulting in added assembly cost. Additionally, precise driving of the adjustment member into the adjustment gear is required to ensure proper orientation of the adjustment shaft within the adjustment gear and to prevent damage to the adjustment gear during assembly. This complicates automated assembly.

Third, conventional adjusters such as the one disclosed in Ryder et al. can cause damage to the reflector or can themselves fail if the input shaft is continued to be rotated beyond the adjustment shaft's designed range of travel. Damage occurs if the adjuster is over-adjusted in either direction to the point where the adjustment member forces the reflector to the point of cracking or breaking or the force between the adjuster, the reflector, and the housing is such that the adjuster itself becomes dislodged or otherwise misaligned or has an internal failure.

The mechanical advantage gained by using a threaded adjustment shaft produces high levels of force with minimal applied adjustment torque. This mechanical advantage combined with the inherent variations in prevailing torque hinders the recognition of potentially damaging torque build-up before damage or failure occurs. Attempts have been made to design an input shaft assembly that has a torque-limiting feature that slips under excess torque build-up from over-adjustment. However, such input shaft systems often prematurely slip and prevent desired adjustment because the mechanical advantage of the thread causes the variations related to prevailing torque and input shaft torque limiting variation to overlap.

Accordingly, a need exists for a headlamp adjuster in which the rotation resistance can be more precisely controlled, which has a smooth operation, which prevents damage-causing adjustments or over-adjustments, and which is cost-effective and easily manufactured and installed.

SUMMARY OF THE INVENTION

The present invention relates to an improved headlamp adjuster that allows for precise control of rotation resistance, ensures smooth operation, prevents damage-causing over-adjustment, and which solves the problems raised or not solved by existing headlamp adjuster designs. As described in more detail below and shown in the accompanying drawings, the headlamp adjuster of the present invention uses interference between the input shaft and the gear housing to create a rotational resistance to retain adjustment and can include a force limiting feature that prevents damage from over-adjustment of the adjuster.

A headlamp adjuster in accordance with one embodiment of the present invention includes a snap-fit gear housing assembly formed from two sections—a body and a cover, a drive gear with an input shaft having a shoulder portion, a pre-threaded adjustment gear, a threaded adjustment shaft ending in a ball stud, and an anti-rotation nut. The drive gear and the adjustment gear intermesh inside the snap-fit housing assembly such that rotation of the drive gear causes rotation of the adjustment gear around the threads of the adjustment shaft. Because the adjustment shaft is prevented from rotating by the anti-rotation nut, the rotation of the adjustment gear around the adjustment shaft causes movement of the adjustment shaft along its axis. Alternatively, the adjustment shaft could be prevented from rotating by non-rotatable attachment of the ball stud to the reflector.

The input shaft of the drive gear extends through a reinforced neck in the housing assembly so that the input shaft can be rotated using a standard tool by a person adjusting the aim of the headlight. The shoulder portion of the input shaft tightly fits within the neck because the neck has a slightly smaller interior diameter than the diameter of the shoulder portion of the shaft. Thus, the friction fit between the interior of the neck and the shoulder portion of the input shaft creates a rotation resistance which retains the adjuster in adjustment when the vehicle is bumped or jostled. The dimension of the interior diameter of the neck, the diameter of the shoulder portion of the shaft, the amount of reinforcement, and the thickness of the walls of the neck can all be adjusted to either increase or decrease the rotation resistance as desired for a particular application. The shoulder portion may be stepped to include both an interference region and a non-interference region. The non-interference region acts as a guide in assembly and reduces edge stress at the opening of the neck. Providing the rotation resistance at the input shaft instead of at the interface between the adjustment member and the adjustment gear allows better control of the amount of torque created, allows greater consistency in finished products, and allows the use of non-metallic adjustment members because thread forming is not required and the torque between the adjustment gear and adjustment shaft is generally minimal. The use of non-metallic adjustment members also decreases cost and weight and provides better corrosion resistance. Additionally, the use of a flexible adjustment member allows inclusion of the force-limiting feature described below.

The adjustment gear has a pre-threaded bore through which the adjustment shaft is screwed such that it threadingly engages the threads in the bore. The threading engagement between the adjustment shaft and the bore in the adjusting gear is such that the shaft can freely rotate within the bore without displacing or deforming the threads of the bore. This is accomplished by dimensioning the threads within the bore such that there is no interference with the threads on the adjustment shaft. The adjustment shaft passes though an anti-rotation nut non-rotatably secured within the gear housing assembly and extends through the wall of the assembly. The anti-rotation nut includes tines that interact with the adjustment shaft to prevent rotation thereof. The adjustment shaft has a ball stud on one end which can be inserted into the reflector of the headlamp.

The snap-fit housing assembly in which the drive and adjustment gears intermesh is an open chamber formed by a body portion and a cover portion. The adjustment gear is journaled on one end within a substantially circular neck that extends outwardly from the chamber and also non-rotatably houses the anti-rotation nut. The adjustment gear is journaled on its other end by the adjustment member passing therethrough and continuing through the wall of the housing assembly. A gasket may be provided on the exterior of the housing to ensure a sealed fit of the adjuster to the headlamp assembly.

Because of the use of rotation resistance at the input shaft rather than at the interface between the adjustment member and the adjustment gear, the adjustment shaft may be formed from plastic or other relatively softer non-metallic or polymeric material. Of course, conventional metal material may also be used. The adjustment member includes a threaded shaft portion that has a grooved portion for interaction with the tines of the anti-rotation nut. The threaded shaft ends in a ball stud and may include a reduced diameter portion around which an o-ring may be placed to seal the adjustment shaft with the interior of the housing assembly. If a feature to prevent damage from over-adjustment is desired, the adjustment shaft is formed from a flexible material and includes at least one slotted portion in the threaded region thereof. If excessive force is generated on the adjustment shaft during over-adjustment, the slotted portion of the adjustment shaft allows the external threads to flex inwardly which allows the internal threads of the adjustment gear to pass over. During each revolution of over-adjustment, the threads flex in and then snap back to position making an audible clicking sound indicating over-adjustment. This feature directly limits the force at the adjustment shaft which can cause damage and overcomes the inherent disadvantages of the torque limiting input shaft design previously attempted. Thus, the problem of damage or failed parts due to over-adjustment of the adjuster is eliminated. In one embodiment, two slotted portions are provided in the threaded region of the adjustment shaft. The two slotted regions represent the ends of the range of movement of the adjustment shaft—the areas in which the force-limiting feature would be most beneficial as excess force typically occurs at the ends of the range of adjustment.

The new design has numerous benefits that make it more advantageous for use compared to conventional designs. The pre-formed non-interference threads within the adjustment gear results in no chips or cracks from thread forming into the adjustment gear since the internal threading is already formed in the molding process. There are less variables to control and influence prevailing torque variation. This is because the torque is generated directly at the base of the input shaft and is not significantly influenced by other variables such as gear tooth profile, gear alignment, gear forces and surface friction between the other moving parts in the gear box. Since the internal thread is pre-formed in the adjustment gear, non-metallic flexible adjustment shafts may be used. Non-metallic shafts are advantageous in preventing corrosion and flexibility is needed if the force-limiting feature is desired. The interference fit between the input shaft and the adjuster housing does not rattle under road vibration. The input shaft is better supported for adjustment purposes because there is no clearance or looseness at the base of the shaft. This is especially desirable for designs requiring longer input shafts. The thread forming constraints with regard to driver speed during assembly are eliminated because thread-forming is eliminated with the input-shaft interference prevailing torque method. Since there are no significant forces between the gear teeth during adjustment, the adjuster has a smoother operational feel than conventional designs. Rotation resistance is easily controlled by monitoring the two interfering diameters during production of the input shaft and housing. If a particular application needs higher or lower rotation resistance, this can be achieved by designing in a change to the length of interference (shoulder length) and/or a changes to the degree of radial interference (shoulder breadth). Finally, the problem of damage or failed parts due to over-adjustment of the adjuster is eliminated if the force-limiting feature is implemented in a particular design.

While the present invention is particularly useful in automotive headlamp assemblies, other applications are possible and references to use in a headlamp assembly should not be deemed to limit the application of the present invention. Additionally, while the force limiting feature works well with the particular headlamp adjuster shown, it may also be used in other threaded adjustment devices where limiting thread force is desired. Rather, the present invention may be advantageously adapted for use where similar performance capabilities and characteristics are desired. These and other objects and advantages of the present invention will become apparent from the detailed description, claims, and accompanying drawings.

BRIEF DESCRIPTION OF THE DRAWINGS

FIG. 2A is a cross-section of the adjustment gear shown in FIG. 2;

DETAILED DESCRIPTION

Figure 1:
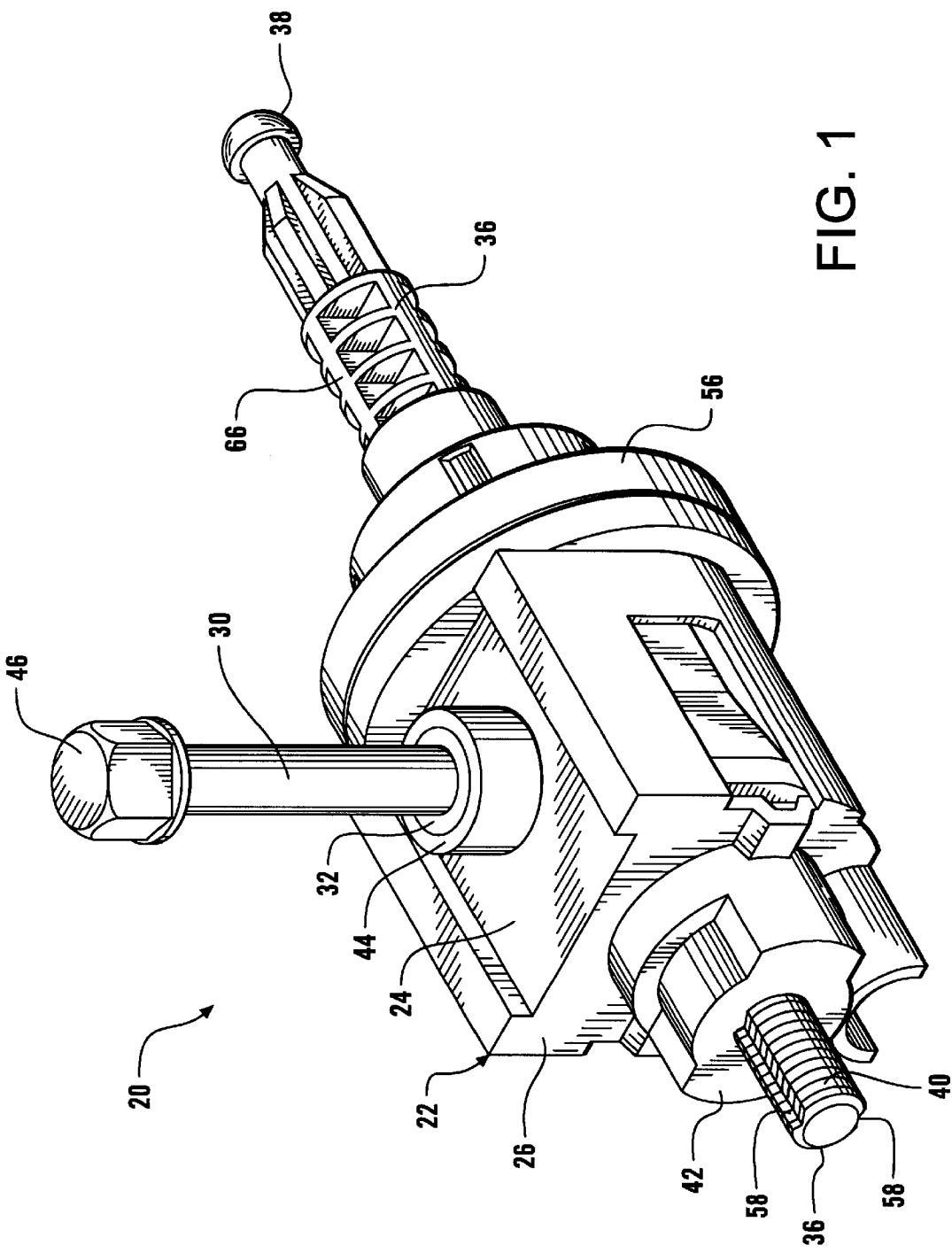
FIG. 1 is a perspective view of a headlamp adjuster constructed in accordance with one embodiment of the present invention.
Figure 3:
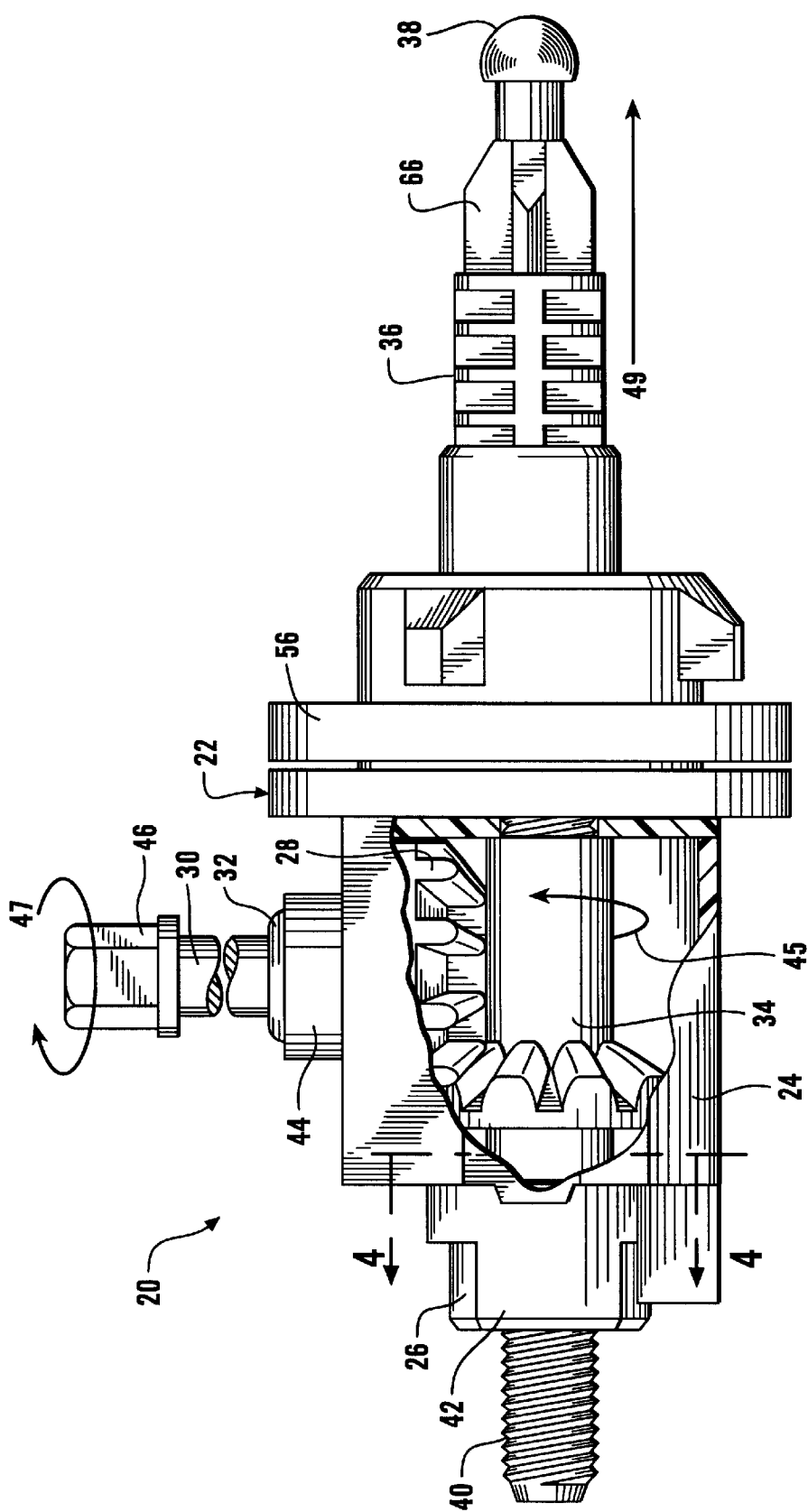
FIG. 3 is a partial-cross-sectional side view a headlamp adjuster constructed in accordance with one embodiment of the present invention with rotation of the input shaft indicated by arrow 47.
Figure 5:
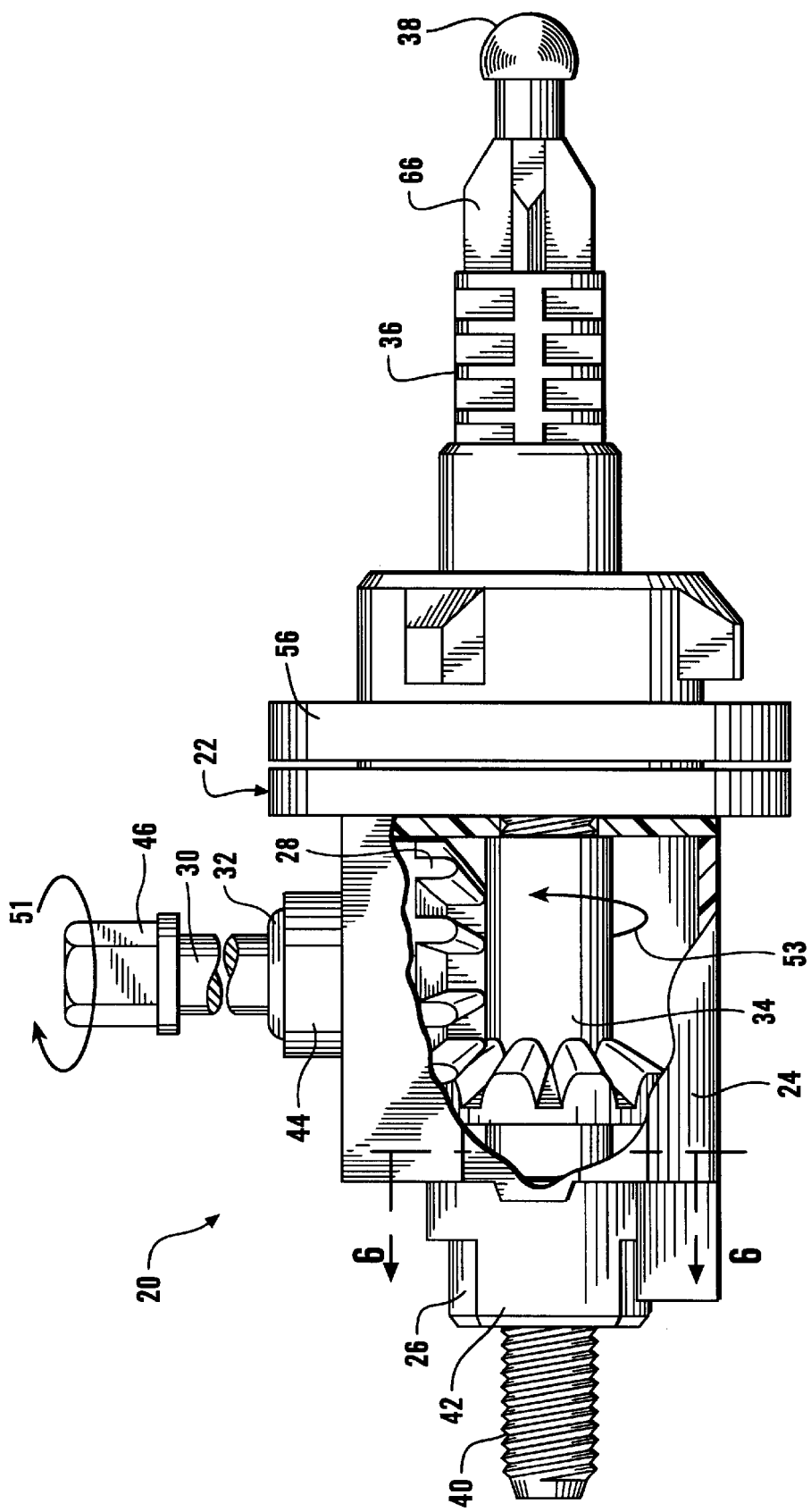
FIG. 5 is a is a partial-cross-sectional side view a headlamp adjuster constructed in accordance with one embodiment of the present invention with rotation of the input shaft indicated by arrow 51.

As shown in FIG. 1, a headlamp adjuster (identified generally as 20) in accordance with one embodiment of the present invention includes a snap-fit gear housing 22 formed from two sections—a body 24 and a cover 26, a drive gear 28 (see FIG. 3) with an integral input shaft 30 having a shoulder 32, an internally threaded adjustment gear 34 (FIG. 3), a threaded adjustment shaft 36 ending in a ball stud 38, and an anti-rotation insert (not shown). As best seen in FIGS. 3 and 5, the drive gear 28 and the adjustment gear 34 intermesh inside the snap-fit housing 22 such that rotation of the drive gear 28 causes rotation of the adjustment gear 34 around threads 40 of the adjustment shaft 36. Because the adjustment shaft 36 is prevented from rotating by the anti-rotation insert non-rotatably housed within a portion 42 of the cover 26 of the housing 22, rotation of the adjustment gear 34 around the adjustment shaft 36 causes movement of the adjustment shaft 36 along its axis. A detailed description of the functioning of an anti-rotation insert is included in U.S. Pat. No. 5,707,133 to Burton, the disclosure of which is incorporated herein by reference. Alternatively, the adjustment shaft 36 could be prevented from rotating by non-rotatable attachment of the ball stud 38 to the reflector.

Figure 7:
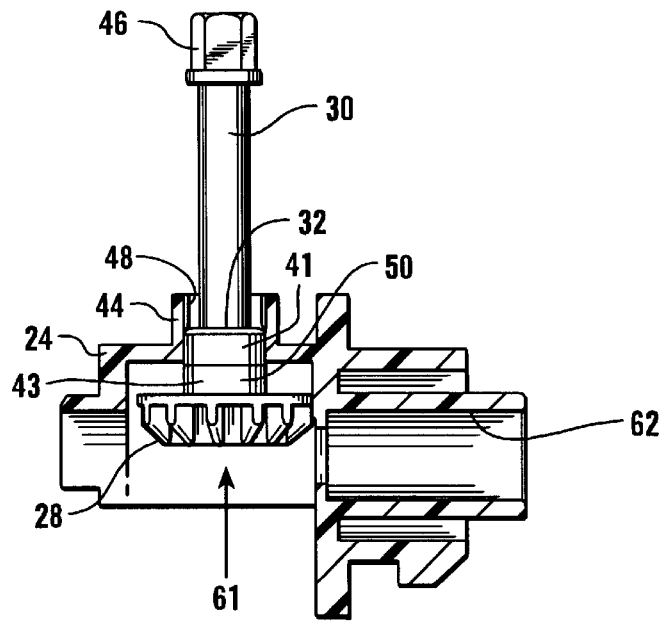
FIG. 7 is a partial-cross-sectional side view of an input shaft/drive gear being installed in the direction of arrow 61 into the body portion of the snap-fit gear housing in accordance with one embodiment of the present invention.
Figure 8:
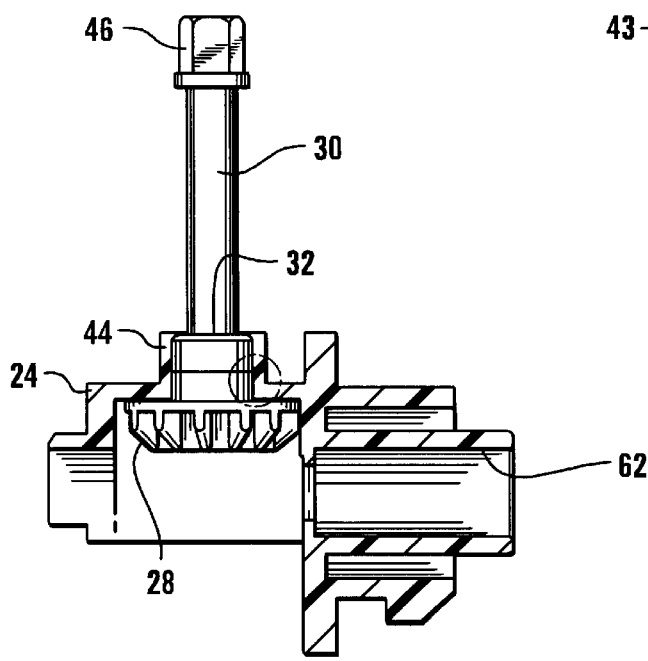
FIG. 8 is a partial-cross-sectional side view of an input shaft/drive gear after installation into the body portion of the snap-fit gear housing in accordance with the embodiment of the present invention shown in FIG. 7.
Figure 9:
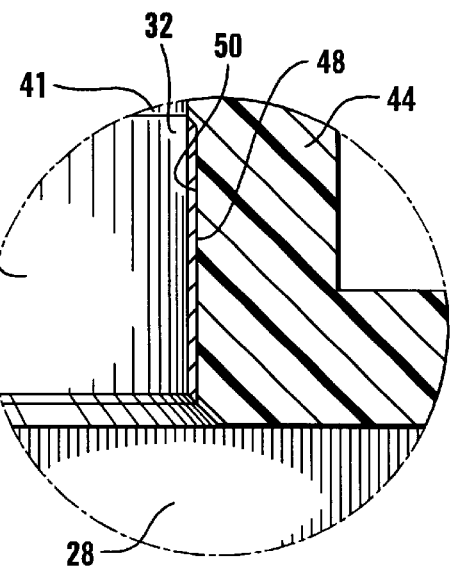
FIG. 9 is a detail view of a portion of FIG. 8.

Referring now to FIGS. 7–9, the input shaft 30 of the drive gear 28 extends through a reinforced neck 44 in the body 24 of the housing 22 so that the input shaft 30 can be rotated using a standard tool by a person adjusting the aim of the headlight. The head 46 of the input shaft 30 may be any number of conventional drive tool configurations such as hexagonal, Torx®, etc. The shoulder 32 of the input shaft 30 tightly fits within the reinforced neck 44 because the neck 44 has a slightly smaller interior diameter 48 than the exterior diameter 50 of the shoulder 32 of the input shaft 30. Thus, the friction fit between the interior diameter 48 of the neck 44 and the exterior diameter 50 of the shoulder 32 of the input shaft 30 creates a rotation resistance which retains the adjuster 20 in adjustment when the vehicle is bumped or jostled. The dimension of the interior diameter 48 of the neck 44, the exterior diameter 50 of the shoulder 32 of the input shaft 30, and the amount of reinforcement (thickness and/or ribbing support) in the reinforced neck 44 can all be adjusted to either increase or decrease the rotation resistance as desired for a particular application. FIG. 9 is a detail view showing the interference between the exterior diameter 50 of the shoulder 32 and the interior diameter 48 of the neck 44.

As can be seen in FIGS. 8 and 9, the shoulder 32 may have a stepped configuration with a smaller diameter upper portion 41 positioned nearer to the head 46 of the input shaft 30 and a larger diameter lower portion 43 positioned near the drive gear 28. The use of such a stepped configuration provides guidance and alignment of the input shaft 30 into the neck 44 during assembly. In the stepped configuration, the exterior diameter 50 of the lower portion of the shoulder 32 interferes with the interior diameter 48 of the neck 44. Positioning the interference in the lower portion of the neck 44 reduces the stress of the interference fit which helps prevent cracking of the neck 44. This is because the lower portion of the neck 44 receives additional stabilizing support from being more closely attached to the body 24.

Figure 2:
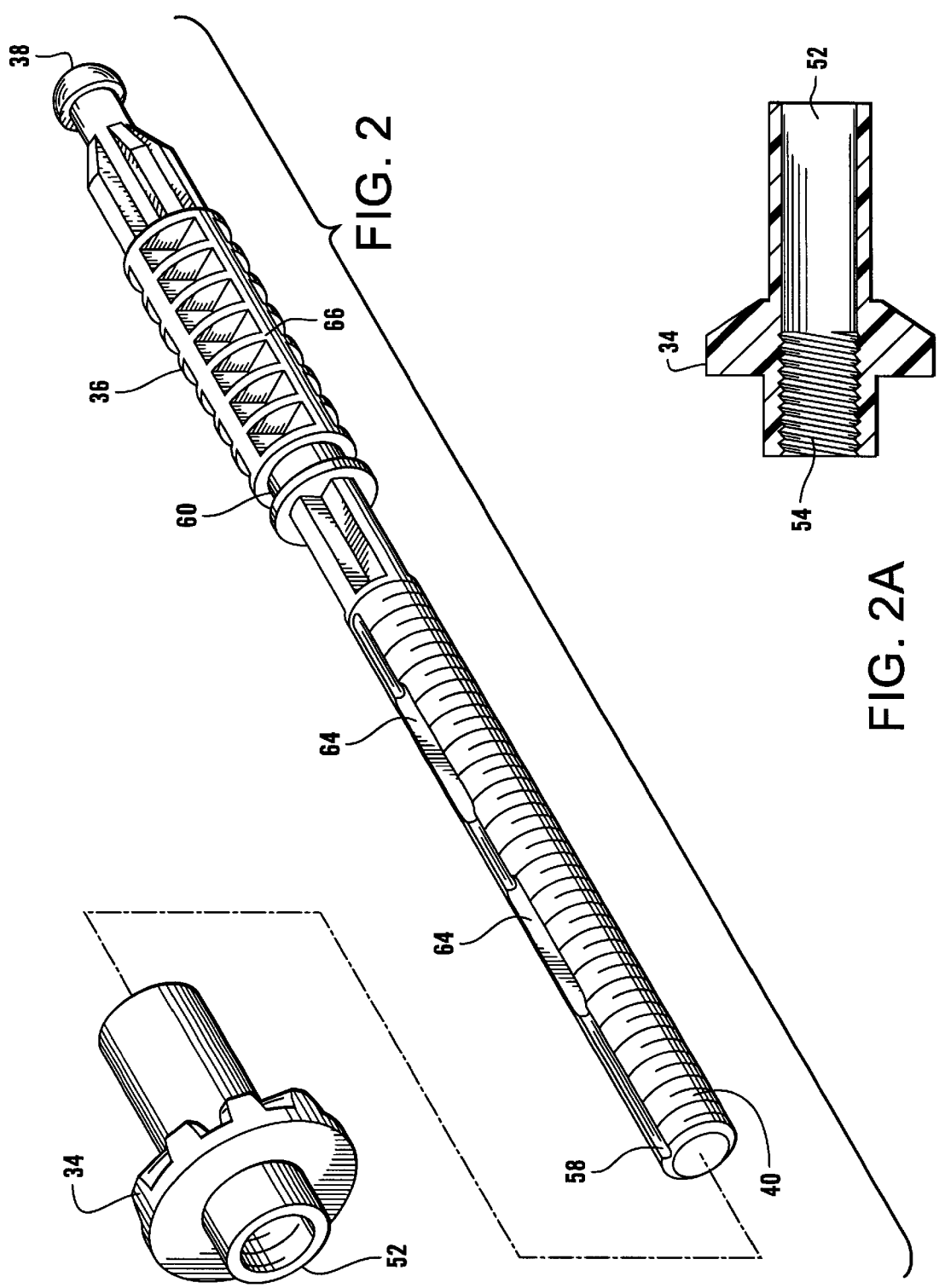
FIG. 2 is an exploded perspective view of the an adjustment shaft and adjustment gear constructed in accordance with one embodiment of the present invention.

As seen in FIGS. 2 and 2A, the adjustment gear 34 has a bore 52 with a threaded portion 54 through which the adjustment shaft 36 is screwed such that it threadingly engages the threaded portion 54 in the bore 52. The threading engagement between the adjustment shaft 36 and the bore 52 in the adjustment gear 34 is such that the shaft 36 can freely rotate within the bore 52 without displacing or deforming the threaded portion 54 of the bore 52. This is accomplished by dimensioning the threaded portion 54 within the bore 52 such that there is no interference with the threads 40 on the adjustment shaft 36. Because rotation resistance is provided between the shoulder 32 of the input shaft 30 and the reinforced neck portion 44 of the housing 22, the threaded portion 54 of the bore 52 may be quite short because there is not much torque between the adjustment shaft 36 and the adjustment gear 34. Reducing the length the threaded portion 54 is desirable because it reduces overall adjustment gear 34 tooling and manufacturing costs.

The snap-fit housing 22 in which the drive gear 28 and adjustment gear 34 intermesh is an open chamber formed by the body 24 and the cover 26. Appropriate housing 22 configurations are described in detail in the incorporated Burton patents. While the housing 22 shown in the figures is known as a "quarter-turn mount" style adjuster, because it is mountable to a headlamp assembly by a quarter-turn, the present invention can be used in other style adjusters. Additionally, a gasket 56 may be provided on the exterior of the housing 22 to ensure a sealed fit of the adjuster 20 to the headlamp assembly.

Because of the use of rotation resistance at the input shaft 30 rather than at the interface between the adjustment shaft 36 and the adjustment gear 34, the adjustment shaft 36 may be formed from plastic or other relatively softer material. Of course, metal material may also be used as is conventional. The adjustment shaft 36 includes threads 40 that have a grooved portion 58 for interaction with the tines of the anti-rotation insert. The adjustment shaft 36 ends in a ball stud 38 and may include an o-ring placement groove 60 around which an o-ring may be placed to seal the adjustment shaft 36 with an interior tube portion 62 of the body 24 of the housing 22. If a force-limiting feature is desired, the adjustment shaft 36 is formed from a flexible material such as plastic and includes at least one slotted portion 64 in the threaded region 40 thereof (FIG. 2). If excessive force is applied by the adjustment gear 34 to the slotted portion 64 of the adjustment shaft 36, the threads 40 around the slotted portion 64 flex inwardly as indicated by arrows 59 in FIG. 6 to allow the threaded portion 54 of the adjustment gear 34 to pass over the threads 40 of the adjustment shaft 36 and create the force limiting effect. In the embodiment shown in FIG. 2, two slotted portions 64 are provided in the threaded region 40 of the adjustment shaft 36. The two slotted regions 64 represent the ends of the range of movement of the adjustment shaft 36. These are the areas in which the force-limiting feature is most likely to be beneficial as a forced adjustment typically occurs at the ends of the range of adjustment. The adjustment shaft 36 also includes a non-threaded region 66 that may be a smooth, solid shaft portion or may have material removed as shown in FIG. 2 to save molding time, material costs, and weight. In either case, the non-threaded region 66 should be designed with sufficient stiffness to ensure that proper adjustments can be made and retained.

Figure 4:
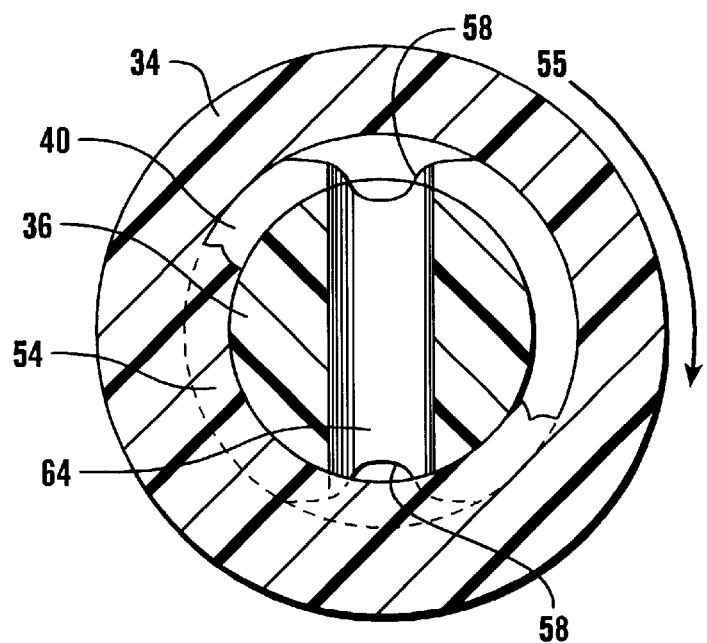
FIG. 4 is a cross-section of the adjustment gear shown in FIG. 3 taken generally along the line 4—4.

FIGS. 3 and 4 show the regular adjusting operation of the headlamp adjuster 20. Rotation of the head 46 of the input shaft 30 in the direction indicated by arrow 47 in FIG. 3 results in rotation of the connected drive gear 28. The drive gear 28 is intermeshed with the adjustment gear 34 which thus rotates in the direction indicated by arrow 45 in FIG. 3 and arrow 55 in FIG. 4. The threaded portion 54 of the bore 52 in the adjustment gear 34 engages the threads 40 on the adjustment shaft 36. Because the adjustment shaft 36 is restrained from rotating, the movement of the threaded portion 54 of the bore in the adjustment gear 34 around the adjustment shaft 36 causes the adjustment shaft 36 to move along its axis in the direction indicated by arrow 49 in FIG. 3. This movement of the adjustment shaft 36 causes the adjustment of the reflector connected to the adjustment shaft 36 at the ball stud 38.

Figure 6:
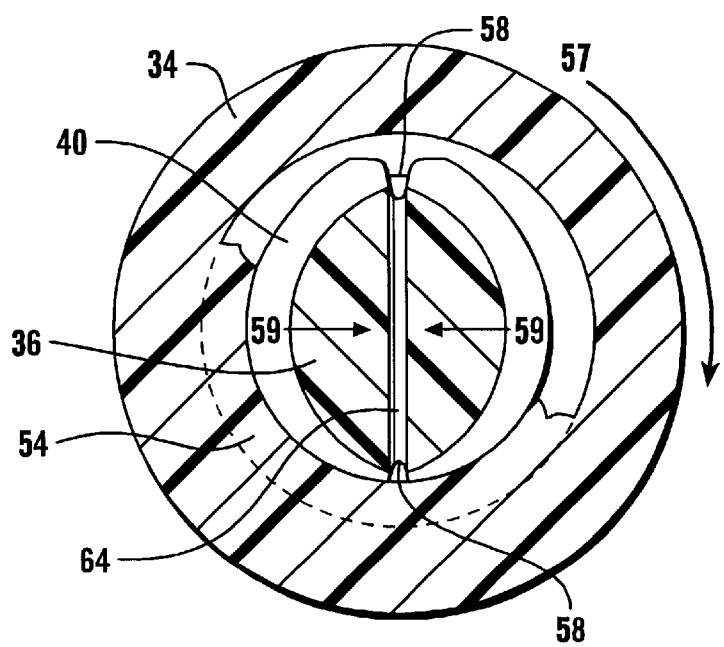
FIG. 6 is a cross-section of the adjustment gear shown in FIG. 5 taken generally along the line 6—6.

FIGS. 5 and 6 show the force limiting operation of the headlamp adjuster 20 which occurs when over-adjustment is attempted or where axial movement of the adjustment shaft 36 is otherwise restrained. Rotation of the head 46 of the input shaft 30 in the direction indicated by arrow 51 in FIG. 5 results in rotation of the connected drive gear 28. The drive gear 28 is intermeshed with the adjustment gear 34 which thus rotates in the direction indicated by arrow 53 in FIG. 5 and arrow 57 in FIG. 6. As in regular adjusting operation, the threaded portion 54 of the bore 52 in the adjustment gear 34 engages the threads 40 on the adjustment shaft 36. However, if the level of force in the interface between the threaded portion 54 of the bore 52 in the adjustment gear 34 and the threads 40 on the adjustment shaft 36 becomes too high, e.g., if a damaging over-adjustment is being attempted, then the slotted portion 64 of the adjustment shaft 36 flexes in the direction indicated by arrows 59 in FIG. 6. The flexing of the slotted portion 64 of the adjustment shaft 36 allows the threaded portion 54 of the bore 52 in the adjustment gear 34 to slip over the threads 40 on the adjustment shaft 36 and axial movement of the adjustment shaft 36 is thereby restrained. Further rotation of the head 46 of the input shaft 30 merely causes continued slipping of the threads while making an audible clicking sound with no axial movement of the adjustment shaft 36 and no damaging over-adjustment of the reflector. When the direction of the rotation is reversed, the thread re-engages and axial movement is allowed in the opposite direction.

Assembly of a headlamp adjuster 20 in accordance with one embodiment of the present invention is quite simple. First, as indicated by arrow 61 in FIG. 7, the input shaft 30 is inserted through the neck 44 of the body portion of the snap-fit housing 22 such that the shoulder 32 is tightly fitted within the neck 44 and the adjustment gear 34 extends within the body 24. The adjustment gear 34 is then placed in the body 24 such that it intermeshes with the adjustment gear. Next, if a sealed fit between the adjuster 20 and the headlamp assembly is required, an o-ring is placed over the o-ring placement groove 60 on the adjustment shaft 36. The adjustment shaft 36 is threaded through the threaded portion 54 of the bore 52 through the adjustment gear 34. After threading, if an o-ring was included on the adjustment shaft 36, it is sealingly positioned between the adjustment shaft 36 and the interior tube portion 62 of the body 24. The anti-rotation insert slides over the adjustment shaft 36 such that the tines interface with the grooved portion 58 of the adjustment shaft 36. The cover 26 is then snap-fitted over the body 24 to form the housing 22 which non-rotatably secures the anti-rotation insert within a portion 42 of the cover 26. Of course, if anti-rotation is achieved by non-rotatably securing the ball stud 38 to the reflector or any other means, then the anti-rotation insert would not be needed. If required in the particular application, gasket 56 can be engaged on the housing 22. Assembly of the adjuster 22 is complete and it is ready for installation in the headlamp assembly.

As illustrated by the foregoing description and shown in the Figures, the present invention is more suitable as a headlamp adjuster than are conventional adjusters. The present invention overcomes the limitations and disadvantages of existing adjusters by utilizing an effective design wherein rotation resistance can be precisely controlled, smooth operation is endured, and damage-causing over-adjustment is prevented.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. An adjuster mechanism comprising:
a housing having a neck;
an adjustment shaft extending from the housing, the adjustment shaft engageable in a reflector of a headlamp; and
an input shaft extending through the neck of the housing in an interference fit, the input shaft rotatable to cause movement of the adjustment shaft, the interference fit providing a resistance to rotation of the input shaft sufficient to retain the adjustment shaft extending from the housing in a desired adjustment.

2. The adjuster mechanism of claim 1 wherein the housing is a gear housing.

3. An adjuster mechanism comprising:
a gear housing having a neck;
an adjustment shaft extending from the housing, the adjustment shaft engageable in a reflector of a headlamp;
an input shaft extending through the neck of the housing in an interference fit, the input shaft rotatable to cause movement of the adjustment shaft, the interference fit providing a resistance to rotation of the input shaft sufficient to retain the adjustment shaft extending from the housing in a desired adjustment;
a drive gear connected to the input shaft such that rotation of the input shaft causes rotation of the drive gear, the drive gear disposed within the gear housing; and
an adjustment gear disposed within the housing such that it intermeshes with the drive gear, the adjustment gear having a bore therethrough that is at least partially threaded, the adjustment shaft threaded through the bore through the adjustment gear.

4. The adjuster mechanism of claim 3 further comprising an anti-rotation insert secured within the housing, the adjustment shaft extending through the anti-rotation insert so that rotation of the adjustment shaft is prevented.

5. The adjuster mechanism of claim 3 wherein the adjustment shaft ends in a ball stud, the ball stud including means for restraining rotation of the adjustment shaft.

6. The adjuster mechanism of claim 3 wherein the input shaft includes a stepped shoulder portion with a smaller diameter portion and a larger diameter portion, the larger diameter portion interfacing with the neck of the gear housing to provide the interference fit.

7. The adjuster mechanism of claim 3 wherein the adjustment shaft is manufactured from a flexible material and includes a force limiting means.

8. The adjuster mechanism of claim 7 wherein the force limiting means comprises at least one slotted portion in the adjustment shaft.

9. An adjuster mechanism comprising:
a gear housing;
a drive gear connected to an input shaft such that rotation of the input shaft causes rotation of the drive gear, the drive gear disposed within the gear housing;
an adjustment gear disposed within the gear housing such that it intermeshes with the drive gear, the adjustment gear having a bore therethough that is at least partially threaded;
an adjustment shaft threaded through the bore through the adjustment gear such that rotation of the input causes axial movement of the adjustment shaft during normal adjusting operation; and
a force limiting means forming part of the adjustment shaft, the force limiting means inhibiting axial movement of the adjustment shaft if over-adjustment of the adjuster is attempted.

10. An adjuster mechanism comprising:
a gear housing;
a drive gear connected to an input shaft such that rotation of the input shaft causes rotation of the drive gear, the drive gear disposed within the gear housing;
an adjustment gear disposed within the gear housing such that it intermeshes with the drive gear, the adjustment gear having a bore therethough that is at least partially threaded;
an adjustment shaft threaded through the bore through the adjustment gear such that rotation of the input causes axial movement of the adjustment shaft during normal adjusting operation; the adjustment shaft manufactured from a flexible material; and
a force limiting means forming part of the adjustment shaft, the force limiting means inhibiting axial movement of the adjustment shaft if over-adjustment of the adjuster is attempted, the force limiting means including at least one slotted portion in the adjustment shaft.

11. An adjuster mechanism comprising:
a gear housing;
a drive gear connected to an input shaft such that rotation of the input shaft causes rotation of the drive gear, the drive gear disposed within the gear housing;
an adjustment gear disposed within the gear housing such that it intermeshes with the drive gear, the adjustment gear having a bore therethough that is at least partially threaded;
an adjustment shaft threaded through the bore through the adjustment gear such that rotation of the input causes axial movement of the adjustment shaft during normal adjusting operation, the adjustment shaft manufactured from a flexible material; and
a force limiting means forming part of the adjustment shaft, the force limiting means inhibiting axial movement of the adjustment shaft if over-adjustment of the adjuster is attempted, the force limiting means including two spaced apart slotted portions in the adjustment shaft.

12. The adjuster mechanism of claim 11 wherein the first of the two spaced apart slotted portions is disposed at one end of a range of desired axial movement of the adjuster shaft and the second of the two spaced apart slotted portions is disposed at a second end of the range of desired axial movement.

13. The adjuster mechanism of claim 12 further comprising an anti-rotation insert secured within the gear housing, the adjustment shaft extending through the anti-rotation insert so that rotation of the adjustment shaft is prevented.

14. The adjuster mechanism of claim 12 wherein the adjustment shaft ends in a ball stud, the ball stud including means for restraining rotation of the adjustment shaft.

15. An adjuster mechanism comprising:

gear housing;

a drive gear connected to an input shaft such that rotation of the input shaft causes rotation of the drive gear, the drive gear disposed within the gear housing, the input shaft extending from the gear housing and including a head positioned outside the gear housing;

an adjustment gear disposed within the gear housing such that it intermeshes with the drive gear, the adjustment gear having a bore therethough that is at least partially threaded;

an adjustment shaft threaded through the bore through the adjustment gear such that rotation of the input causes axial movement of the adjustment shaft during normal adjusting operation; and a force limiting means forming part of the adjustment shaft, the force limiting means inhibiting axial movement of the adjustment shaft if over-adjustment of the adjuster is attempted.

16. An adjuster mechanism comprising:

a gear housing;

a drive gear connected to an input shaft such that rotation of the input shaft causes rotation of the drive gear, the drive gear disposed within the gear housing, the input shaft including a stepped shoulder portion with a smaller diameter portion and a larger diameter portion, the larger diameter portion interfacing with a neck of the gear housing to provide the interference fit;

an adjustment gear disposed within the gear housing such that it intermeshes with the drive gear, the adjustment gear having a bore therethough that is at least partially threaded;

an adjustment shaft threaded through the bore through the adjustment gear such that rotation of the input causes axial movement of the adjustment shaft during normal adjusting operation; and a force limiting means forming part of the adjustment shaft, the force limiting means inhibiting axial movement of the adjustment shaft if over-adjustment of the adjuster is attempted.

17. An adjuster mechanism comprising:

a gear housing having a neck;

an adjustment shaft extending from the gear housing, the adjustment shaft engageable in a reflector of a headlamp, the adjustment shaft including a force limiting means;

an input shaft extending through the neck of the gear housing in an interference fit, the interference fit providing a resistance to rotation of the input shaft sufficient to retain the adjustment shaft extending from the housing in a desired adjustment;

a drive gear connected to the input shaft such that rotation of the input shaft causes rotation of the drive gear, the drive gear disposed within the gear housing; and an adjustment gear disposed within the gear housing such that it intermeshes with the drive gear, the adjustment gear having a bore therethough that is at least partially threaded, the adjustment shaft threaded through the bore through the adjustment gear.

18. The adjuster mechanism of claim 17 wherein the adjustment shaft is manufactured from a flexible material and the force limiting means comprises at least one slotted portion in the adjustment shaft.

19. The adjuster mechanism of claim 17 wherein the adjustment shaft is manufactured from a flexible material and the force limiting means comprises a first slotted portion of the adjustment shaft spaced apart from a second slotted portion of the adjustment shaft, the first slotted portion located at one end of a range of desired axial movement of the adjuster shaft and the second slotted portion located at a second end of the range of desired axial movement.

20. The adjuster mechanism of claim 17 wherein the input shaft includes a stepped shoulder portion with a smaller diameter portion and a larger diameter portion, the larger diameter portion interfacing with the neck of the gear housing to provide the interference fit.

21. The adjuster mechanism of claim 17 further comprising an anti-rotation insert secured within the housing, the adjustment shaft extending through the anti-rotation insert so that rotation of the adjustment shaft is prevented.

22. The adjuster mechanism of claim 17 wherein the adjustment shaft ends in a ball stud, the ball stud including means for restraining rotation of the adjustment shaft.

23. A adjuster for use in adjusting the aim of a headlamp, the adjuster comprising:

an adjustment shaft operably connected to the headlamp such that movement of the adjustment shaft causes adjustment to the aim of the headlamp, the adjustment shaft being at least partially threaded; and a force limiting means included in the at least partially threaded portion of the adjustment shaft, the force limiting means operable to inhibit axial movement of the adjustment shaft and to prevent damage to the adjuster and the headlamp if over-adjustment of the adjuster is attempted.

24. A adjuster for use in adjusting the aim of a headlamp, the adjuster comprising:

an adjustment shaft operably connected to the headlamp such that movement of the adjustment shaft causes adjustment to the aim of the headlamp, the adjustment shaft being at least partially threaded, the adjustment shaft is manufactured from a flexible material; and a force limiting means included in the at least partially threaded portion of the adjustment shaft, the force limiting means operable to inhibit axial movement of the adjustment shaft and to prevent damage to the adjuster and the headlamp if over-adjustment of the adjuster is attempted, the force limiting means comprising at least one slotted portion in the adjustment shaft.

25. A adjuster for use in adjusting the aim of a headlamp, the adjuster comprising:

an adjustment shaft operably connected to the headlamp such that movement of the adjustment shaft causes adjustment to the aim of the headlamp, the adjustment shaft being at least partially threaded, the adjustment shaft manufactured from a flexible material; and a force limiting means included in the at least partially threaded portion of the adjustment shaft, the force limiting means operable to inhibit axial movement of the adjustment shaft and to prevent damage to the adjuster and the headlamp if over-adjustment of the adjuster is attempted, the force limiting means comprising at two slotted portion in the adjustment shaft.

* * * * *